US011617953B2

(12) United States Patent
Schroeder et al.

(10) Patent No.: US 11,617,953 B2
(45) Date of Patent: Apr. 4, 2023

(54) VIRTUAL OBJECT INTERACTION SCRIPTS

(71) Applicant: CONTACT CONTROL INTERFACES, LLC, West Chester Township, OH (US)

(72) Inventors: Zachary Schroeder, Liberty Township, OH (US); John Schroeder, West Chester, OH (US)

(73) Assignee: CONTACT CONTROL INTERFACES, LLC., Cincinnati, OH (US)

( * ) Notice: Subject to any disclaimer, the term of this patent is extended or adjusted under 35 U.S.C. 154(b) by 252 days.

(21) Appl. No.: 17/066,569

(22) Filed: Oct. 9, 2020

(65) Prior Publication Data

US 2022/0111295 A1 Apr. 14, 2022

(51) Int. Cl.
*A63F 13/57* (2014.01)
*G06F 3/01* (2006.01)

(52) U.S. Cl.
CPC .............. *A63F 13/57* (2014.09); *G06F 3/014* (2013.01); *G06F 3/016* (2013.01); *G06F 3/013* (2013.01)

(58) Field of Classification Search
CPC .......... A63F 13/57; G06F 3/014; G06F 3/016; G06F 3/013
USPC .......................................................... 463/31
See application file for complete search history.

(56) References Cited

U.S. PATENT DOCUMENTS

| | | | |
|---|---|---|---|
| 9,652,038 B2* | 5/2017 | Osman | G06F 3/0346 |
| 10,049,493 B1* | 8/2018 | Verizzo | G06F 9/45558 |
| 10,268,275 B2* | 4/2019 | Carter | G06F 3/0416 |
| 10,360,734 B2 | 7/2019 | Drouin et al. | |
| 10,429,923 B1* | 10/2019 | Johnston | G02B 27/0176 |
| 10,438,394 B2 | 10/2019 | Inomata et al. | |
| 10,509,468 B2* | 12/2019 | Kuchenbecker | G06F 3/014 |
| 2012/0274585 A1 | 11/2012 | Telfer et al. | |
| 2018/0095542 A1* | 4/2018 | Mallinson | G06T 19/006 |
| 2018/0173300 A1* | 6/2018 | Schwarz | H04N 13/204 |
| 2020/0372716 A1* | 11/2020 | Murata | G06T 19/006 |

FOREIGN PATENT DOCUMENTS

| | | |
|---|---|---|
| KR | 20190059727 A | 5/2019 |
| KR | 102021851 B1 | 11/2019 |
| WO | 2007093984 A2 | 8/2007 |
| WO | 2018224847 A2 | 12/2018 |

OTHER PUBLICATIONS

Lin, J., &; Schulze, J. P. (2016). Towards Naturally Grabbing and Moving Objects in VR. Electronic Imaging, 2016(4), 1-6. doi:10.2352/issn.2470-1173.2016.4.ervr-415.

* cited by examiner

*Primary Examiner* — Allen Chan

(74) *Attorney, Agent, or Firm* — Dinsmore & Shohl LLP

(57) ABSTRACT

A method includes receiving first data from a game engine, the first data associated with a virtual interaction between a virtual hand and a virtual object in a virtual world, determining if the virtual object is interactable based on the first data, determining if the virtual hand is touching the virtual object in the virtual world based on the first data, and when it is determined that the virtual object is interactable and the virtual hand is touching the virtual object, outputting second data describing a relationship between the virtual hand and the virtual object based on the first data.

20 Claims, 10 Drawing Sheets

VIRTUAL OBJECT INTERACTION SCRIPTS

TECHNICAL FIELD

The present specification relates to software interfaces for haptic devices and, more particularly, to virtual object interaction scripts.

BACKGROUND

The virtual reality experience industry has seen many changes over the years. As computing power has expanded, developers of virtual reality experiences have likewise created games and other software that take advantage of these increases in computing power. To this end, game developers have been coding experiences that incorporate sophisticated operations and mathematics to produce a realistic and immersive experience.

One type of immersive virtual reality experience involves a glove or other wearable or non-wearable device that a user may use to control a virtual hand or other aspects of a virtual character in a virtual world. The user may then perform physical actions in the real world while wearing or controlling the device that may be mimicked or otherwise implemented by the virtual character in the virtual world.

In one example, the user may wear some form of technology that tracks the motion of the user's hands that may cause a virtual hand of the virtual character in the virtual world to perform similar actions. In particular the user may perform actions to cause the virtual character to perform certain actions with respect to virtual objects in the virtual world, such as picking up or dropping virtual objects. The glove or other technology may also provide haptic feedback to the user as virtual objects are interacted with in the virtual world to further enhance the immersive experience.

Game developers often utilize a game engine, such as Unity or Unreal, to develop games. Game engines provide a framework and a number of tools that developers may use when developing games. Game engines typically include a physics engine that handles physics of virtual objects in a game or virtual world. Thus, a game developer may create virtual objects using the game engine and assign properties to those objects, and the game engine will handle the physics regarding motion of the objects and interactions between various objects in the virtual world. However, game engines do not typically offer direct support for wearable devices, including haptic devices. Accordingly, if a game developer wishes to incorporate such a device into the game (e.g., allowing a player to control aspects of a virtual character with a wearable or non-wearable device), the developer may be required to create a substantial amount of code to manage the interactions between the device and the game engine. Additional code may be required by a game developer if the device is a haptic device and the game or virtual world is to cause haptic feedback with the device based on virtual interactions. Therefore, there is a need for a software layer that manages interactions between a game engine and a wearable or non-wearable device.

SUMMARY

In one embodiment, a method includes receiving first data from a game engine, the first data associated with a virtual interaction between a virtual hand and a virtual object in a virtual world, determining if the virtual object is interactable based on the first data, determining if the virtual hand is touching the virtual object in the virtual world based on the first data, and when it is determined that the virtual object is interactable and the virtual hand is touching the virtual object, outputting second data describing a relationship between the virtual hand and the virtual object based on the first data.

In another embodiment, an apparatus includes one or more processors, one or more memory modules, and machine readable instructions stored in the one or more memory modules. When executed by the one or more processors, the instructions cause the apparatus to receive first data from a game engine, the first data associated with a virtual interaction between a virtual hand and a virtual object in a virtual world, determine if the virtual object is interactable based on the first data, determine if the virtual hand is touching the virtual object in the virtual world based on the first data, and when it is determined that the virtual object is interactable and the virtual hand is touching the virtual object, output second data describing a relationship between the virtual hand and the virtual object based on the first data.

In another embodiment, a system includes a haptic device, a game engine, an interaction script, a haptic engine, one or more processors, one or more memory modules, and machine readable instructions stored in the one or more memory modules. When executed by the one or more processors, the instructions cause the interaction script to receive first data from the game engine, the first data associated with a virtual interaction between a virtual hand and a virtual object in a virtual world, determine if the virtual object is interactable based on the first data, determine if the virtual hand is touching the virtual object in the virtual world based on the first data, and when it is determined that the virtual object is interactable and the virtual hand is touching the virtual object, output second data describing a relationship between the virtual hand and the virtual object based on the first data.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
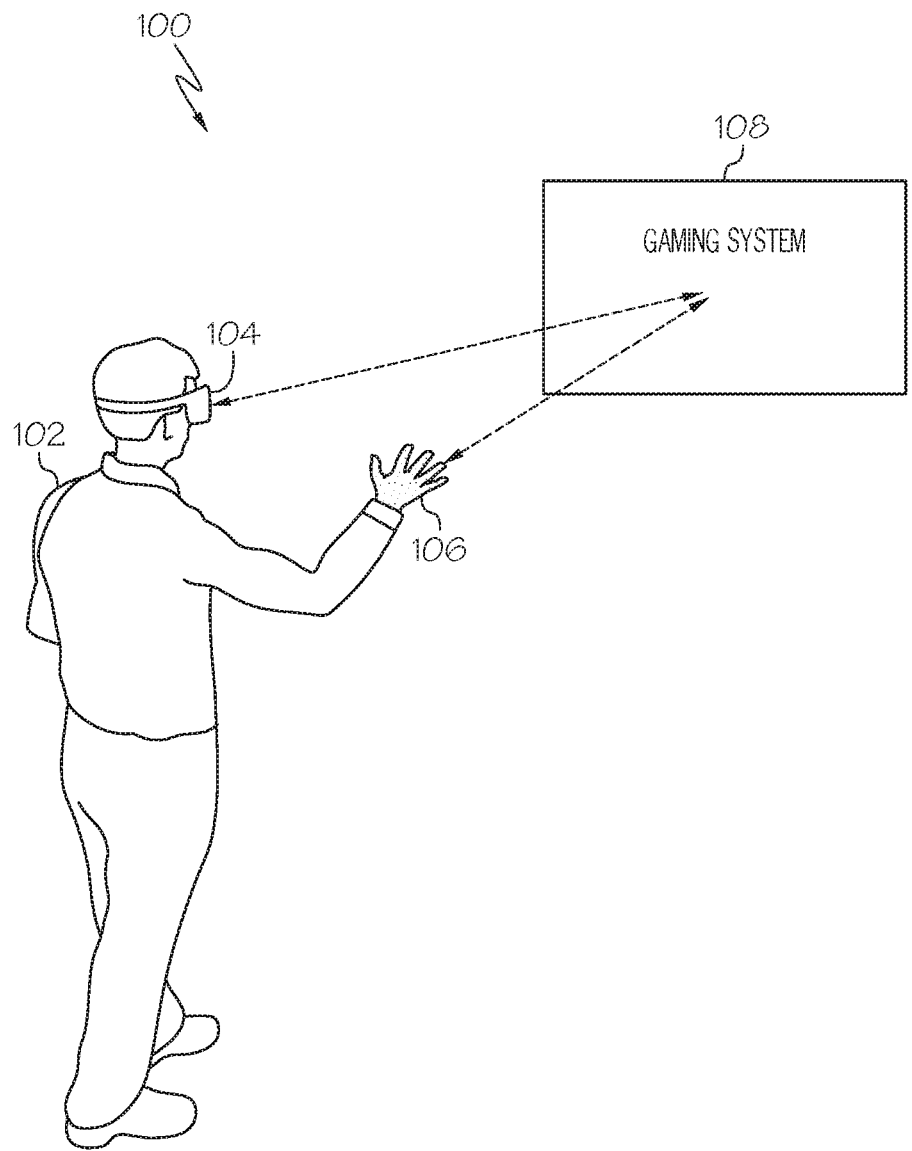
FIG. 1 depicts an example system for a wearable haptic device that may be used to interact with a gaming system, according to one or more embodiments shown and described herein.

The embodiments disclosed herein describe virtual object interaction scripts or components that may be used with a game engine to manage interactions between a wearable or non-wearable device and a game or virtual world running on the game engine. A game engine is a software platform that may be utilized by game developers to create games and/or other interactive software. Examples of game engines include Unity and Unreal, among others. A game engine may allow a game developer to create virtual reality games and other immersive experiences. A virtual reality game or experience may include a virtual world that a player may explore by controlling one or more virtual characters in the virtual world.

The virtual world may be presented to a player through three-dimensional graphics. As the player moves a virtual character through the virtual world, the character may encounter virtual objects that may be interacted with. These interactions may be managed by the game engine, which may have a physics engine to determine realistic physics for the objects in the game. Thus, the game engine may handle the physics relating to interactions (e.g., collisions) between objects in the virtual world.

The game engine may handle collisions between objects in the virtual world through the use of colliders. Colliders are software components that game developers may attach to virtual objects in a game or virtual world. Once a collider is attached to an object, the game engine tracks the position of the collider to determine when collisions with other objects occur. That is, when a volume of a first collider of a first object and a volume of a second collider of a second object intersect, the game engine determines that a collision has occurred between the first and second objects. Once a collision occurs, the game engine may determine the subsequent movement of the objects based on properties of the objects (e.g., the shapes of the colliders, the material properties of the colliders, etc.) and the conditions of the collision (e.g., the speed of the colliders at the time of the collision, the direction of movement of the colliders, etc.).

When a collision occurs between a virtual character and a virtual object, the game engine may return data associated with the collision. The game engine may then determine how the game should proceed based on the collision. While the collision may be handled simply using the physics engine of the game engine, game developers may desire more complex interactions between the character and the object. For example, it may be desired for the character to have the ability to pick up an object, drop an object, throw an object, or perform other actions with respect to the object. In addition, it may also be desired for a haptic response to be produced when the character collides with an object.

Accordingly, disclosed herein are virtual object interaction scripts that may receive collider data associated with collisions between a virtual character and virtual objects to allow for such interactions between the character and objects in a virtual world. In particular, the virtual object interaction scripts disclosed herein may manage interactions between objects in a virtual world and a character that has one or more aspects controlled by a wearable or non-wearable device, such as a haptic glove. Accordingly, a game developer who desires to allow a character in a game to have one or more aspects controlled by such a wearable device may utilize the disclosed virtual object interaction scripts. The scripts will then automatically handle interactions between the character and the virtual objects based on parameters set by the game developer without the need for the game developer to include code to handle these interactions. This may reduce the amount of code that the game developer needs to provide, thereby allowing the developer to focus on other aspects of the game and increasing the efficiency of game development.

Referring now to the drawings, FIG. 1 depicts an illustrative system 100 for implementing a virtual reality experience, according to one or more embodiments shown and described herein. In the example of FIG. 1, a user or player 102 wears a headset 104 and a haptic glove 106. The headset 104 and the haptic glove 106 are functionally coupled to a gaming system 108. In some examples, the headset 104 and the haptic glove 106 may be connected to the gaming system 108 through a wired connection. In other examples, the headset 104 and the haptic glove 106 may be connected to the gaming system 108 through a wireless connection. In some examples, the components of the gaming system 108 may be incorporated into the headset 104. While the example of FIG. 1 illustrates a player wearing a haptic glove 106, in other examples, the system 100 may include any other wearable or non-wearable device that the user 102 may wear or otherwise use to control one or more aspects of a virtual character, as disclosed herein.

In the example of FIG. 1, the gaming system 108 comprises a hardware system running gaming or other software that operates a virtual reality game or immersive experience. Specifically, the gaming system 108 creates a virtual world that the user 102 may interact with, as disclosed herein. The hardware system of the gaming system 108 may comprise a personal computer, a gaming console, or other specialized hardware. The gaming system 108 may receive signals from the headset 104 and/or the haptic glove 106 and may send signals to the headset 104 and/or the haptic glove 106 as described herein. Details of the gaming system 108 are discussed further below in connection with FIG. 2.

The haptic glove 106 may be worn by the user 102 and may be used to interact with a virtual world created by the gaming system 108 (e.g., by controlling one or more aspects of a virtual character). In the example of FIG. 1, the user 102 may move their hand while wearing the haptic glove 106 to control the hand of a virtual character in the virtual world created by the gaming system 108. As such, the user 102 may use their hand to cause the virtual character to interact with objects in the virtual world of the gaming system 108 as described herein. While in the example of FIG. 1, the user 102 interacts with the virtual world of the gaming system 108 through the haptic glove 106, in other examples, the user 102 may interact with the virtual world of the gaming system 108 through other controllers or one or more other wearable devices.

In the example of FIG. 1, the system 100 tracks the position and orientation of the haptic glove 106 as it is worn by the user 102. The position and orientation of the haptic glove 106 may be transmitted to the gaming system 108 and the gaming system 108 may utilize the received position and orientation of the haptic glove 106 to control interactions in the virtual world. For example, as the user 102 moves their hand in a certain manner, the gaming system may cause the hand of the character in the virtual world to be moved in a similar manner. As the user 102 moves their fingers into a particular pose, the gaming system may cause the hand and fingers of the character in the virtual world to be moved to a similar pose. Thus, the user 102 may feel as though they are immersed in the virtual world of the gaming system 108.

In some examples, a position of the user's hand may be tracked. In the illustrated example, the user's hand is tracked by a camera that is part of the headset 104. In other examples, the user's hand may be tracked by an external camera (not shown in FIG. 1). In some examples, the haptic glove 106 may have sensors attached thereto to track the movement of the hand of the user 102. In some examples, the system 100 may track the hand of the user 102 through a combination of cameras and/or sensors. It should be understood that any method of tracking the user's hand may be used.

In the example of FIG. 1, the haptic glove 106 may provide haptic feedback to the user 102. Specifically, the haptic glove 106 may provide vibration, force feedback, pressure, temperature changes, or other physical sensations to the fingers and/or palm of the user 102. Accordingly, the haptic glove 106 may provide a more immersive experience to the user 102 as the user 102 interacts with the virtual world. For example, when the virtual character controlled by the user 102 touches an object in the virtual world, the gaming system 108 may cause the haptic glove 106 to provide haptic feedback to the user 102 to simulate the feeling of the user 102 touching the object. The type of haptic feedback provided by the haptic glove 106 may be based on the specific interactions occurring in the virtual world as controlled by the gaming system 108. While the haptic glove 106 worn by the user 102 in the example of FIG. 1 is able to provide haptic feedback to the user 102, in some examples, the wearable device worn by the user 102 may not provide haptic feedback. Furthermore, in some examples, another wearable device or a non-wearable device may be used and tracked rather than the haptic glove 106.

In the example of FIG. 1, the headset 104 worn by the user 102 tracks the gaze of the user 102 and may comprise a display to display the virtual world of the gaming system 108 to the user 102. The image displayed to the user 102 of the virtual world may depend on the gaze of the user 102 tracked by the headset 104. For example, if the user 102 turns their head to the left, the headset 104 may display an image to the left of the character in the virtual world. If the user 102 looks down, the headset 104 may display the ground in front of the character in the virtual world. In some examples, the headset 104 may only track the gaze of the user 102 and an image of the virtual world of the gaming system 108 may be displayed on an external display (e.g., a computer monitor or television). In addition, as explained above, in some examples, the headset 104 may track the motion of the hand of the user 102 wearing the haptic glove 106.

Figure 2:
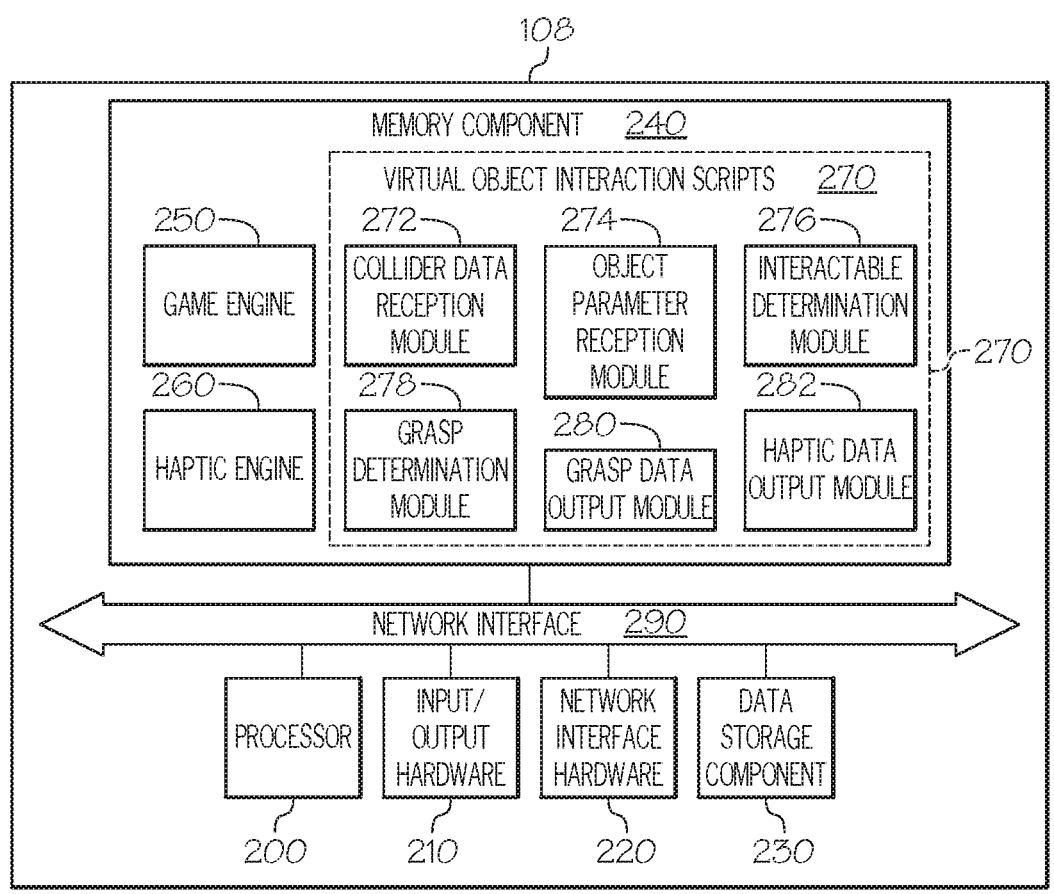
FIG. 2 depicts a schematic diagram of an example gaming system, according to one or more embodiments shown and described herein.

Turning now to FIG. 2, additional details regarding the gaming system 108 are depicted. As illustrated in FIG. 2, the gaming system 108 may include a processor 200, input/output hardware 210, network interface hardware 220, a data storage component 230, and a non-transitory memory component 240. The memory component 240 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store a game engine 250, a haptic engine 260, and one or more virtual object interaction scripts 270 (each of which may be embodied as a computer program, firmware, or hardware, as an example). A network interface 290 is also included in FIG. 2 and may be implemented as a bus or other interface to facilitate communication among the components of the gaming system 108.

The processor 200 may include any processing component configured to receive and execute instructions (such as from the data storage component 230 and/or memory component 240). The input/output hardware 210 may include a monitor, keyboard, mouse, printer, camera, microphone, speaker, touch-screen, and/or other device for receiving, sending, and/or presenting data. The network interface hardware 220 may include any wired or wireless networking hardware, such as a modem, LAN port, wireless fidelity (Wi-Fi) card, WiMax card, mobile communications hardware, and/or other hardware for communicating with other networks and/or devices such as the headset 104 and/or the haptic glove 106.

It should be understood that the data storage component 230 may reside local to and/or remote from the gaming system 108 and may be configured to store one or more pieces of data for access by the gaming system 108 and/or other components. The data storage component 230 of FIG. 2 may store data to be accessed by the game engine 250, the haptic engine 260, and/or the virtual object interaction scripts 270.

The game engine 250 comprises a software platform for game development, such as Unity or Unreal. While the Unity and Unreal game engines are mentioned as exemplary game engines, it should be understood that the game engine 250 may comprise any game engine. The game engine 250 provides a framework that game developers may use to create interactive virtual reality games or experiences. The game engine 250 may allow game developers to create a virtual world through sounds and three-dimensional graphics. Virtual objects may be placed in the virtual world and the user 102 may interact with the virtual world and the objects therein. The game engine 250 may have a physics engine that controls the motion of objects based on realistic physics.

The game engine 250 may allow colliders to be placed on objects in the virtual world. Colliders are software components that may allow for collisions between objects. If two objects that do not have any colliders placed on them collide with each other in the virtual world, the objects may simply pass through each other. However, if two objects with colliders attached to them collide with each other in the virtual world, the game engine 250 may recognize that a collision has occurred between the objects and may take certain actions in the game depending on the types of colliders involved in the collision.

The game engine 250 may allow at least two types of colliders to be placed on objects. The first type of collider is a normal collider. When a normal collider collides with another collider (e.g., the volumes of the two colliders intersect), the game engine 250 recognizes that a collision has occurred and returns data associated with the collision. However, the object with the normal collider does not react to the collision. Alternatively, another type of collider is a rigid body collider. When a rigid body collider collides with another object, the game engine 250 returns data associated with the collision and also causes the object to which the rigid body is attached to react based on the physics engine (e.g., the object may bounce off of the object it collides with). The specific reaction of the object to the collision may be based on the properties of the objects involved in the collision, as specified in the colliders (e.g., mass, shape, and the like).

The game engine 250 may also allow for the use of colliders with different shapes. Exemplary colliders include a sphere collider, a box collider, and a capsule collider, having respective shapes of a sphere, a box, and a capsule. The game engine 250 may also allow for the user of compound and/or mesh colliders, which have more complex shapes and may more closely match the shape of an object.

The game engine 250 may also allow game developers to create a virtual character in the virtual world with one or more aspects that may be controlled by the user 102. In the illustrated example, a virtual character may be at least partly controlled by the user 102 through the use of the haptic glove 106. In some examples, the user 102 may move their hand while wearing the haptic glove 106 to control the movement of the hand of the virtual character in the virtual world. As explained above, the system 100 may track the motion of the haptic glove 106 being worn by the user 102 and may transmit the tracking information to the game engine 250. The game engine 250 may then cause the virtual character to move or otherwise behave based on the received tracking information. In other examples, aspects of the virtual character may be controlled by other controllers and/or wearable devices worn by the user 102.

In order for the virtual character to interact with objects in the virtual world, colliders must be placed on the virtual character. When colliders are placed on the virtual character, the game engine 250 may determine when the virtual character collides with other virtual objects that have colliders placed on them. The game engine 250 may then return data associated with the colliders involved in the collision (e.g., the speed and acceleration of the colliders, the angle of approach of the colliders, how colliders contacted each other, and the like). As such, game developers may utilize this information provided by the game engine 250 to create more complex interactions between a virtual character and virtual objects in the virtual world. These interactions may be managed by the virtual object interaction scripts 270, as disclosed herein.

In particular, collider data may be utilized by the virtual object interaction scripts 270 to determine whether a virtual character should pick up, drop, or otherwise interact with a virtual object in the virtual world. Accordingly, colliders may be placed on a hand of a virtual character such that collisions between the colliders on the hand of the virtual character and other objects in the virtual world may be detected by the game engine 250 and transmitted to the virtual object interaction scripts 270. As such, colliders may be placed at certain locations on the hand of the virtual character such that interactions between the hand of the virtual character and virtual objects in a virtual world may be detected.

In one example, colliders may be placed at each fingertip and each knuckle of the hand of the virtual character. Accordingly, the game engine 250 may detect collisions between the fingertips and knuckles of the virtual hand and virtual objects. However, it may be desirable to have additional colliders on the virtual hand in order to have additional coverage of the virtual hand. Thus, additional arrangements of colliders on the virtual hand may be used, as discussed herein.

Figure 3:
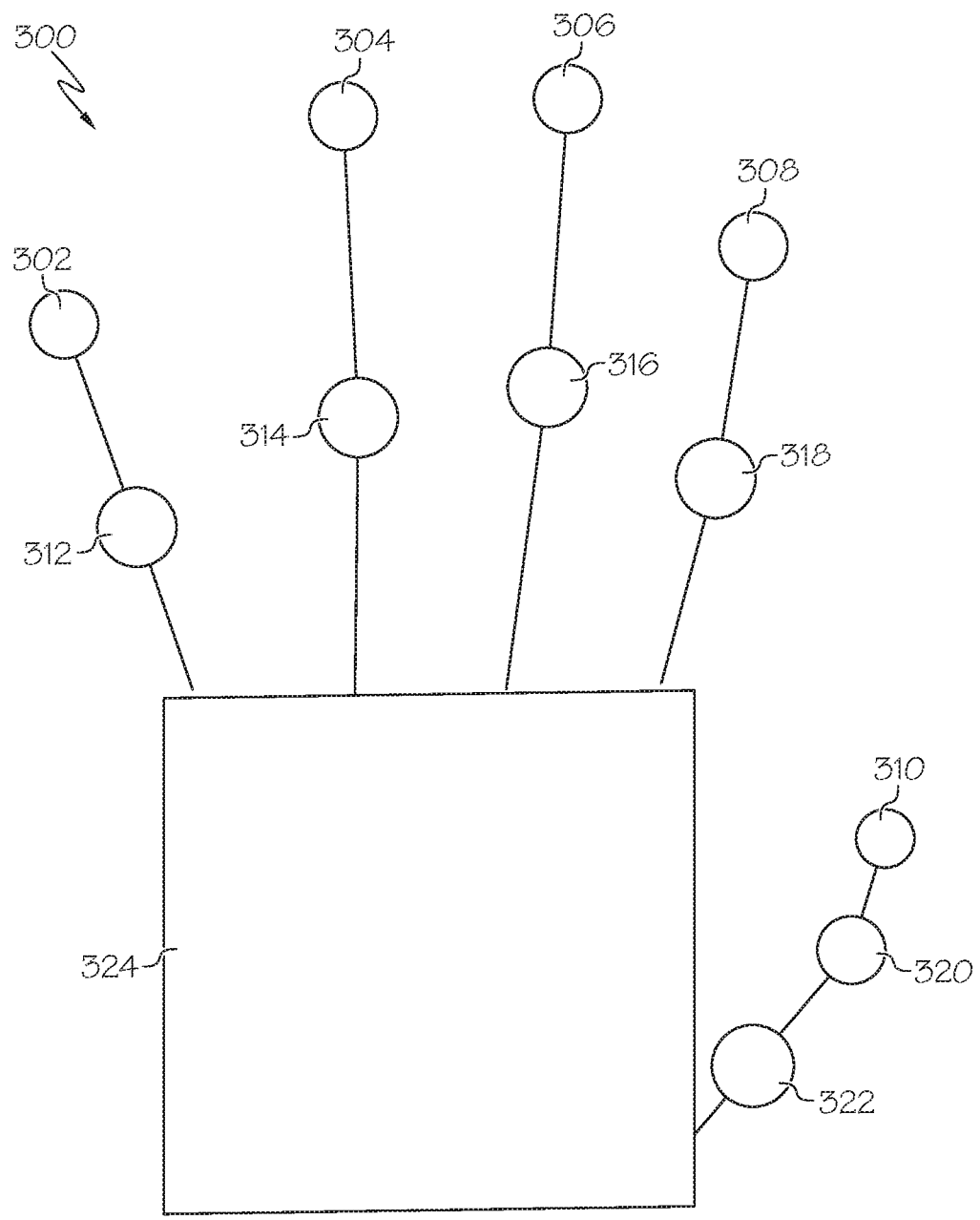
FIG. 3 depicts an exemplary virtual hand and colliders placed on the virtual hand, according to one or more embodiments shown and described herein.

In one example, as shown in FIG. 3, a virtual hand 300 has sphere colliders 302, 304, 306, and 308, and 310 at the fingertips of each finger and thumb. The virtual hand 300 also has sphere colliders 312, 314, 316, 318, and 320 at the knuckles at the midpoint of each finger and thumb. The virtual hand 300 also has a sphere collider 322 at the knuckle at the base of the thumb and a box collider 324 representing the palm. However, in other examples, other arrangements of colliders on a virtual hand may be used to provide better coverage of the hand such that interactions between the virtual hand and virtual objects may be more accurately detected.

Figure 4:
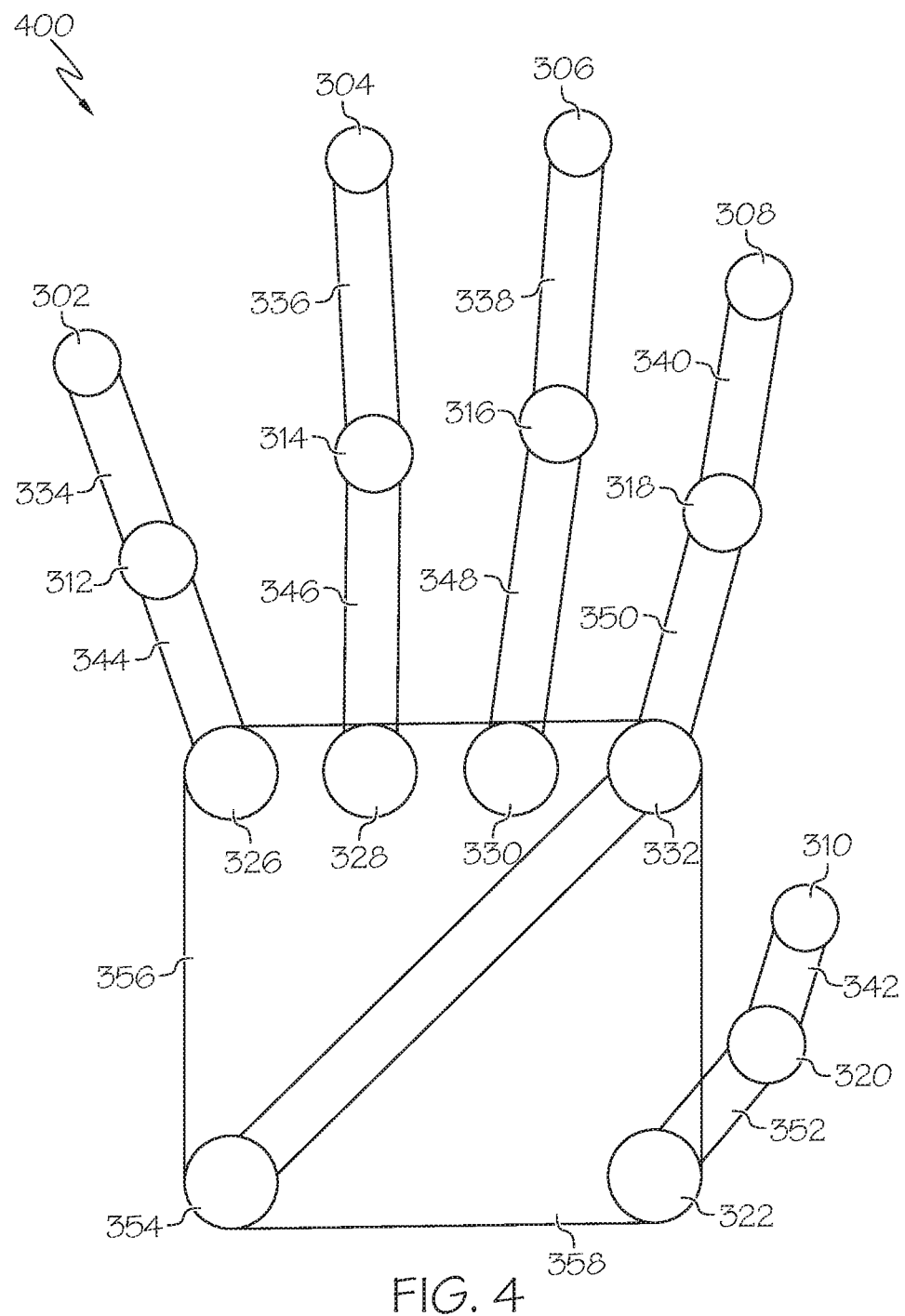
FIG. 4 depicts another exemplary virtual hand and colliders placed on the virtual hand, according to one or more embodiments shown and described herein.

FIG. 4 depicts a virtual hand 400 and a set of colliders that may be placed thereon for increased coverage of the virtual hand 400. As shown in FIG. 4, the virtual hand 400 has sphere colliders 302, 304, 308, 308, 310, 312, 314, 316, 318, 320, and 322 positioned at the same locations as on the virtual hand 300 as shown in FIG. 3. However, in FIG. 4, the virtual hand 400 also has sphere colliders 326, 328, 330, and 332 positioned at the knuckles at the base of the fingers. In addition, capsule colliders 334, 336, 338, 340, and 342 are positioned between the colliders at the fingertips of the fingers and thumb and the knuckles at the midpoint of the fingers and thumb. Capsule colliders 344, 346, 348, 350, and 352 are positioned between the colliders at the knuckles at the midpoint of the fingers and thumb and the knuckles at the base of the fingers and thumb. A sphere collider 354 is also added to the base of the palm.

In the example of FIG. 4, the palm of the virtual hand 400 is then represented by two mesh colliders. A palm mesh collider 356 is bounded by colliders 326, 328, 330, 332, and 354, and a thumb mesh collider 358 is bounded by colliders 332, 322, and 354. In the illustrated example, the palm mesh collider 356 is continually recalculated (e.g., every ¹⁄₁₀ second) based on the position of the colliders 326, 328, 330, 332, and 354. If the palm mesh collider 356 is recalculated at a faster rate, the mesh is more accurate. However, more computing resources will be utilized. Alternatively, if the palm mesh collider 356 is recalculated at a slower rate, the mesh will be less accurate but will utilize fewer computing resources.

Figure 5:
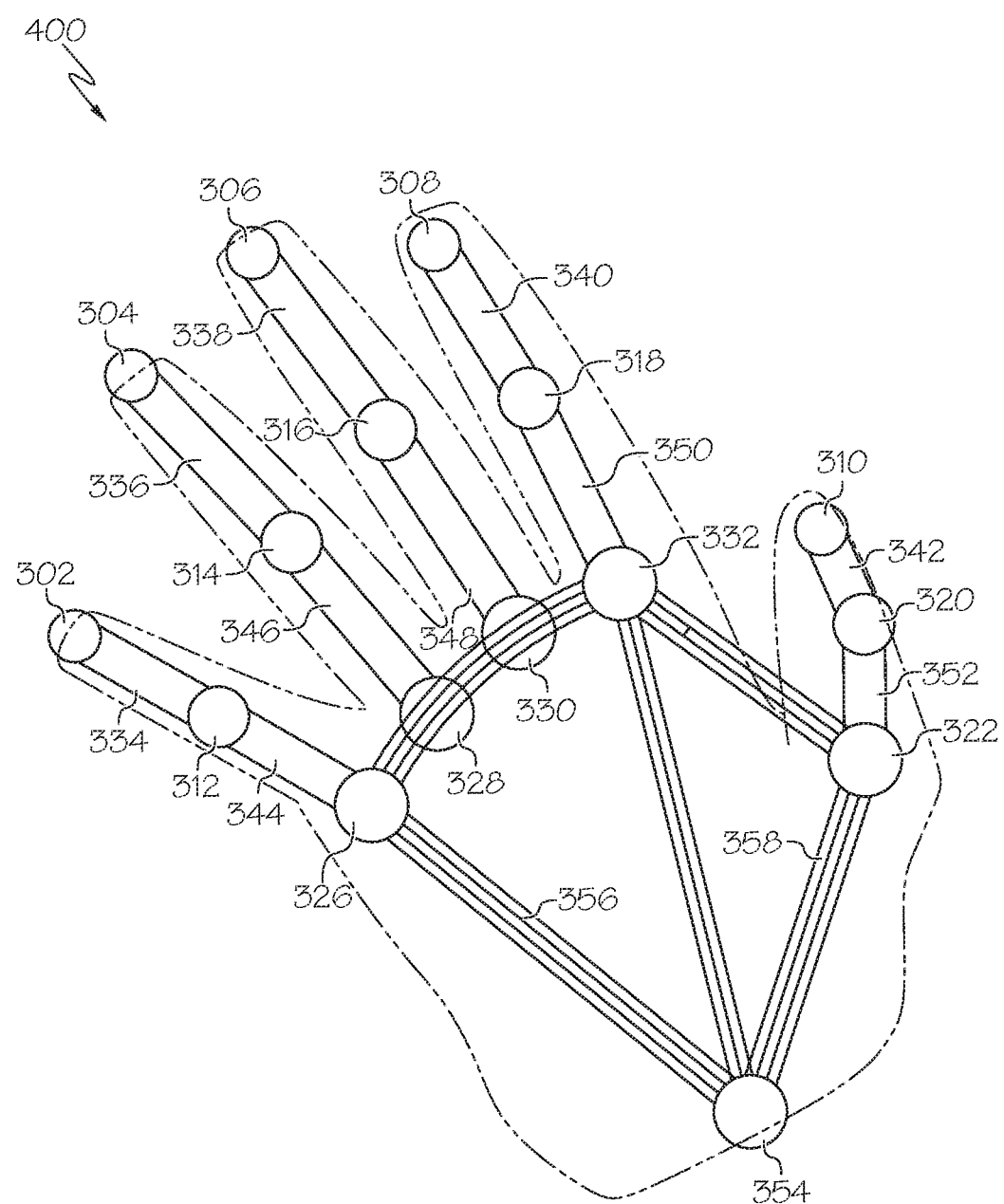
FIG. 5 depicts another exemplary virtual hand and colliders placed on the virtual hand, according to one or more embodiments shown and described herein.

The palm mesh collider 356 and the thumb mesh collider 358 may create a volume that approximates the palm of the hand well and provides better coverage of the palm than the box collider 324. That is, interactions between the virtual hand 400 and small objects in the virtual world may be more likely to be detected in the example of FIG. 4 than with the virtual hand 300 in the example of FIG. 3. FIG. 5 shows a more detailed view of the example virtual hand 400 of FIG. 4 and the placement of the colliders 302-358 on the virtual hand 400.

Referring back to FIG. 2, the virtual object interaction scripts 270 may receive data from and send data to the game engine 250. In some examples, the virtual object interaction scripts 270 may also send data to the haptic engine 260. In the illustrated example, the virtual object interaction scripts 270 comprise one or more scripts or components that may be installed or added to the game engine 250. As such, the virtual object interaction scripts 270 may continuously receive data from the game engine 250 (e.g., every frame of operation of the game engine 250) regarding the state of the game or virtual world being created and managed by the game engine 250. The virtual object interaction scripts 270 may transmit data to the game engine 250 and/or the haptic engine 260 based on this data. Thus, game developers may utilize the virtual object interaction scripts 270 with the game engine 250 such that the virtual object interaction scripts 270 automatically perform the functions described herein. Accordingly, game developers need not write separate code to handle these functions.

In the illustrated example, the virtual object interaction scripts 270 comprise a collider data reception module 272, an object parameter reception module 274, an interactable determination module 276, a grasp determination module 278, a grasp data output module 280, and a haptic data output module 282. In some examples, each of the collider data reception module 272, the object parameter reception module 274, the interactable determination module 276, the grasp determination module 278, the grasp data output module 280, and the haptic data output module 282 may comprise a separate script or component. In some examples, one or more of the collider data reception module 272, the object parameter reception module 274, the interactable determination module 276, the grasp determination module 278, the grasp data output module 280, and the haptic data output module 282 may be combined in a single script or components. In some examples, one or more of the collider data reception module 272, the object parameter reception module 274, the interactable determination module 276, the grasp determination module 278, the grasp data output module 280, and the haptic data output module 282 may comprise multiple scripts or components.

The collider data reception module 272 may receive collision data from the game engine 250. Specifically, the collider data reception module 272 may receive collision data from the game engine 250 associated with colliders on the virtual hand 400 as shown in FIGS. 4 and 5. That is, any time there is a collision between any of the colliders on the virtual hand 400 and a collider of an object in the virtual world, the game engine 250 may transmit data associated with this collision to the collider data reception module 272. The data associated with the collision received by the collider data reception module 272 may comprise the speed of the colliders at the time of the collision, the angle of the collision, the position of the objects involved in the collision, and the like. By utilizing the colliders as shown in FIG. 4 on the virtual hand 400, the game engine 250 is likely to detect all relevant collisions between the virtual hand 400 and objects in the virtual world. However, it should be understood that other arrangements of colliders on the virtual hand of the virtual character may be used as well. In some examples, the collider data reception module 272 only receives data associated with the colliders on the virtual hand 400 when a collision occurs with an object in the virtual world. In other examples, the collider data reception module 272 receives data associated with the colliders on the virtual hand 400 even when no collision occurs with an object in the virtual world.

The object parameter reception module 274 receives parameter data associated with objects that collide with the virtual hand 400 of the virtual character from the game engine 250. That is, any time there is a collision between any of the colliders on the virtual hand 400 and a collider of an object in the virtual world, the game engine 250 may transmit data comprising one or more parameter values associated with the object to the object parameter reception module 274. These parameters may comprise various properties of the object including its size, mass, shape, and other properties of the object that are native to the game engine 250. In addition, the object parameter reception module 274 may receive parameters of the object that are particular to the virtual object interaction scripts 270. These parameters may be set by game developers utilizing the virtual object interaction scripts 270 with the game engine 250. One such parameter is whether or not an object is interactable, as discussed below in connection with the interactable determination module 276. Other such parameters are haptic parameters, as discussed below in connection with the haptic data output module 282.

Game developers may desire certain objects in a virtual world to be able to be interacted with by the virtual character and other objects to not be able to be interacted with. As such, game developers may set an interactable parameter for objects in the virtual world. If an object is set to be interactable, then the virtual hand 400 may interact with the object. If an object is not set to be interactable, then the virtual hand 400 may not interact with the object. Accordingly, when a collision occurs between any of the colliders of the virtual hand 400 and a collider of a virtual object, the game engine 250 may transmit the value of the interactable parameter to the object parameter reception module 274. The interactable determination module 276 may then determine whether the object is interactable based on the value of this parameter. If the interactable determination module 276 determines that the object is not interactable, then the remainder of the virtual object interaction scripts 270 ignore the interaction and the virtual hand 400 does not interact with the object. However, if the interactable determination module 276 determines that the object is interactable, then the virtual object interaction scripts 270 perform the additional functionality described herein such that the virtual hand 400 interacts with the object.

When the interactable determination module 276 determines that an object colliding with the virtual hand 400 is interactable, the virtual object interaction scripts 270 may process the interaction based on the collider data and object parameters received by the collider data reception module 272 and the object parameter reception module 274, respectively. The virtual object interaction scripts may then transmit data to the game engine 250 and/or the haptic engine 260 as described herein.

The grasp determination module 278 may determine whether the virtual hand 400 should grasp or hold an object based on collider data. If the virtual hand 400 is not currently holding an object, the grasp determination module 278 may determine whether the virtual hand 400 should pick up the object. If the virtual hand 400 is holding an object, the grasp determination module 278 may determine whether the virtual hand 400 should release the object. In some examples, the grasp determination module 278 may also determine whether the virtual hand 400 should throw the object or perform other actions with respect to the object.

Figure 6:
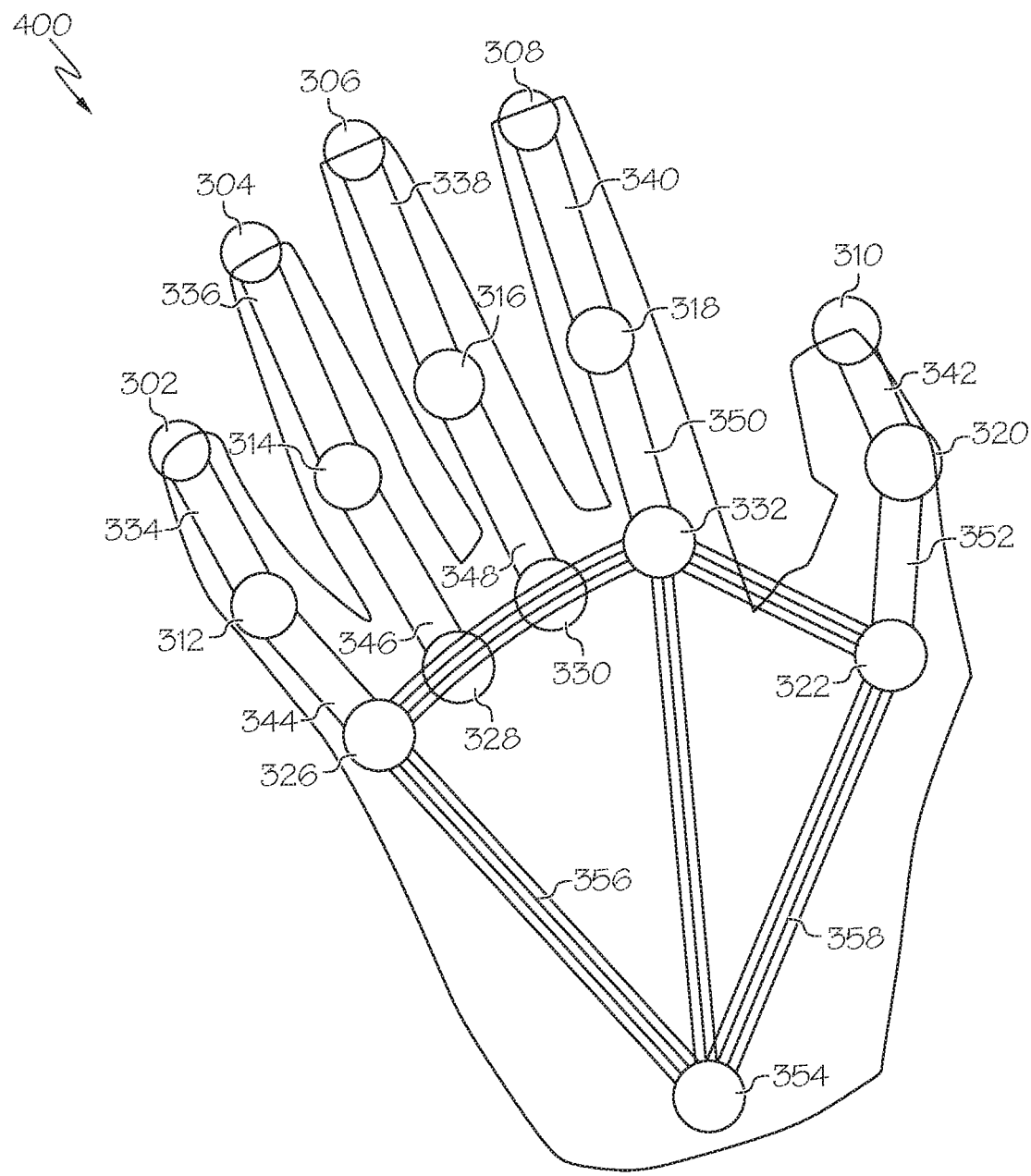
FIG. 6 depicts another exemplary virtual hand and colliders placed on the virtual hand, according to one or more embodiments shown and described herein.

In some examples, the grasp determination module 278 may determine whether the virtual hand 400 should hold an object based on finger curl of the virtual hand 400. That is, the grasp determination module 278 may determine a degree to which the fingers of the virtual hand 400 are curled. If the fingers of the virtual hand 400 are flat, as shown in FIG. 5, finger curl may be 0. Alternatively, if the fingers of the virtual hand 400 are fully curled, finger curl may be 1. When the fingers of the virtual hand 400 are partially curled, as shown in FIG. 6, a finger curl may have a value between 0 and 1. A parameter may then be set for the virtual object interaction scripts 270 indicating a finger curl value at which point a grab of an object should be initiated. For example, if a collider of the virtual hand 400 is touching a collider of an object and the finger curl value of the virtual hand 400 is greater than 0.1, the grasp determination module 278 may determine that the virtual hand 400 should pick up the object.

While the use of finger curl may allow the grasp determination module 278 to determine whether to pick up or drop an object, it may be difficult to determine an accurate value of finger curl. As such, in the illustrated example, a different method of determining whether the virtual hand 400 should pick up or drop an object may be used, as described below.

In some examples, the grasp determination module 278 may determine that a grab of an object should be initiated when at least one collider on a finger of the virtual hand 400 and at least one collider on the thumb of the virtual hand 400 is touching a collider on the virtual object. In other examples, the grasp determination module 278 may determine that a grab of an object should be initiated when at least one collider on a finger of the virtual hand 400 and at least one collider on the palm of the virtual hand 400 is touching a collider on the virtual object. In other examples, a grab of an object may only be initiated when any combination of colliders on the virtual hand 400 make contact with an object collider. The specific colliders of the virtual hand 400 that must be contacted by an object collider in order to initiate a grab may be set as a parameter of the virtual object interaction scripts 270.

Figure 7A:
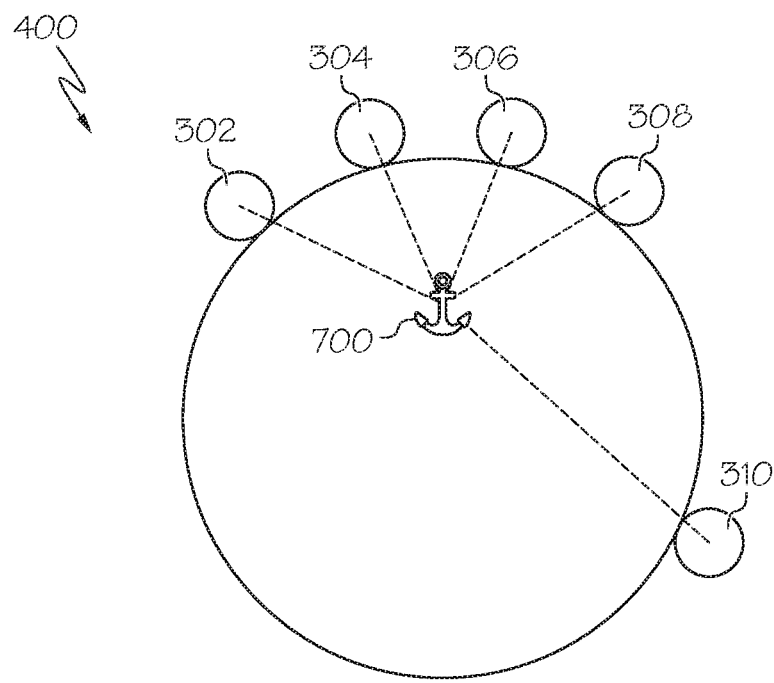
FIG. 7A depicts a cross sectional view of a virtual hand and an anchor point, according to one or more embodiments shown and described herein
Figure 7B:
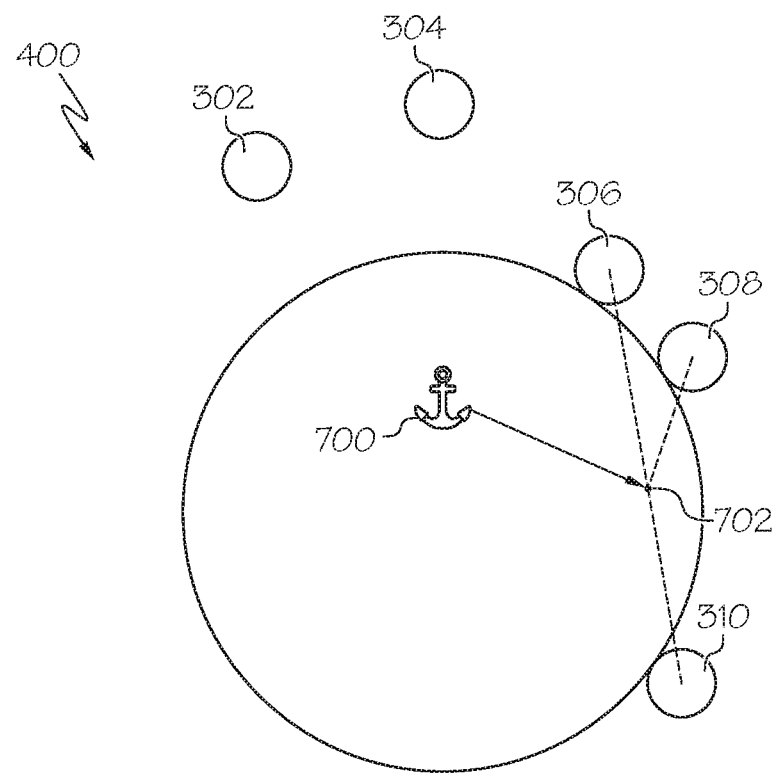
FIG. 7B depicts another cross sectional view of a virtual hand and an anchor point, according to one more embodiments shown and described herein.

Once the grasp determination module 278 determines that a grab of an object by the virtual hand 400 has been initiated, the grasp determination module 278 determines a point that is a centroid of all of the fingers of the fingertips of the virtual hand 400 that are touching the object. This centroid point may be set as an anchor, as explained in further detail below. FIGS. 7A and 7B show simplified illustrations of the virtual hand 400 and the positions of the fingertips of the virtual hand as represented by colliders 302, 304, 306, 308, and 310. As shown in FIG. 7A, an anchor 700 is positioned at the centroid of the fingertip colliders 302, 304, 306, 308, 310, which are all touching an object. In the example of FIG. 7B, the fingers of the virtual hand 400 have moved and only the fingertips represented by the colliders 306, 308, and 310 are touching the object. Accordingly, a new centroid 702 is calculated and the anchor 700 may be moved to the position of the centroid 702.

When an object is first grabbed by the virtual hand 400, the grasp determination module 278 may determine a position of a centroid as discussed above. The grasp determination module 278 may further determine a distance between the centroid and the object being held. As an object is held by the virtual hand 400 and the virtual hand 400 moves and changes its position and orientation over time, the grasp determination module 278 may continually measure the distance between the centroid and the object being held. In particular, the grasp determination module 278 may determine a ratio between a current distance between the centroid and the object being held and the initial distance between the centroid and the object being held when the object was first grabbed. As this ratio changes, the grasp determination module 278 may determine that the object should be released when this ratio is greater than a certain value. This value may be set as a parameter of the virtual object interaction scripts 270. The greater this value is, the more difficult it will be for the virtual hand 400 to release the object.

Returning to FIG. 2, the grasp data output module 280 outputs data to the game engine 250 based on determinations made by the grasp determination module 278. Specifically, the grasp data output module 280 sends a signal to the game engine 250 such that the game engine 250 may implement the virtual hand 400 grabbing or releasing objects in the virtual world.

In the illustrated example, when the virtual hand 400 grabs an object, the grasp data output module 280 sends a signal to the game engine 250 to cause the game engine 250 to establish a hierarchical relationship between the virtual hand 400 and the object to be held. Specifically, the grasp data output module 280 sends a signal to the game engine 250 to establish a parent relationship between the virtual hand 400 and the centroid determined by the grasp determination module 278, and to establish a parent relationship between the centroid and an anchor point of the object. When a parent relationship is established between two objects in the game engine 250, the two objects subsequently move together in the virtual world of the game engine 250. That is, once a parent relationship is established between two objects, the movements of the parent object determine the movements of the child object.

In the illustrated example, establishing a parent relationship between the virtual hand 400 and the centroid ensures that the centroid moves as the virtual hand 400 moves. Furthermore, the object may have an anchor point, which is a parameter of the object that may be set. By establishing a parent relationship between the centroid and the anchor, the anchor (and consequently the object itself) will move with the centroid, which in turn moves with the hand. Thus, establishing this hierarchical relationship between the virtual hand 400 and the object being held ensures that a held object will move with the virtual hand 400, thereby allowing the user 102 to pick up and move an object within the virtual world.

In the illustrated example, establishing the hierarchical relationship described above may offer superior performance over parenting the virtual hand directly to an object. Specifically, the hierarchical relationship described above allows an object to move around the virtual hand 400 while still ensuring that the object is properly held. When the grasp determination module 278 determines that the object should be released by the virtual hand 400, using the techniques described above, the grasp data output module 280 may send a signal to the game engine 250 to discontinue the hierarchical relationship between the virtual hand 400 and the object. That is, the game engine 250 may remove the parent relationship between the virtual hand 400 and the centroid and may discontinue the parent relationship between the centroid and the anchor point of the object. This will cause the movements of the object to once again be handled by the physics engine of the game engine 250 independent of the movement of the virtual hand 400.

While the examples described above disclose picking up and releasing an object with the virtual hand 400, the grasp data output module 280 may send signals to cause the game engine 250 to implement other actions with respect to the virtual hand 400 and the object. For example, the grasp data output module 280 may send a signal to the game engine 250 to cause the virtual hand 400 to throw the object, roll the object, or perform other actions as implemented by game developers.

Figure 8C:
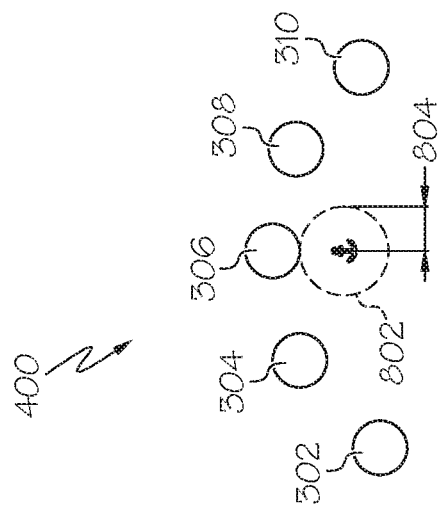
FIG. 8C depicts another cross sectional view of a virtual hand and an anchor point, according to one more embodiments shown and described herein.

In some examples, rather than using the centroid of the fingers of the virtual hand 400 to parent to the anchor point of an object, the virtual interaction scripts may instead use the center of an insphere, as described herein. Because the centroid is calculated as an average position of the four fingers and the thumb, the centroid position will be biased towards the fingers. This is illustrated in FIG. 8A, where the centroid 800 is positioned closer to the finger colliders 302, 304, 306, and 308 of the virtual hand 400 than the thumb collider 310. Thus, in some examples, the grasp determination module 278 may determine an insphere, which is the largest sphere that can fit within the convex hull of a set of control points (e.g., the fingertips of the virtual hand 400).

The convex hull is the smallest set of points that bounds all of the control points and remains convex (e.g., it has no parts that are bent inward). The convex hull can also be defined as the set of points that can be calculated as a linear combination of the control points such that all coefficients are non-negative and sum to 1.

Figure 8B:
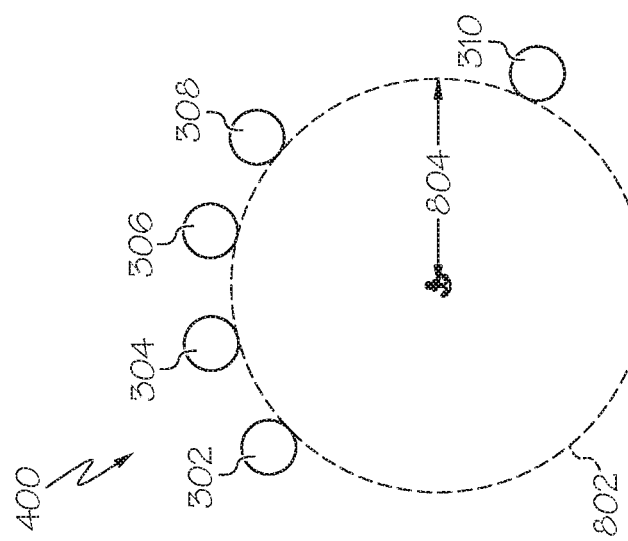
FIG. 8B depicts another cross sectional view of a virtual hand and an anchor point, according to one more embodiments shown and described herein.
Figure 8A:
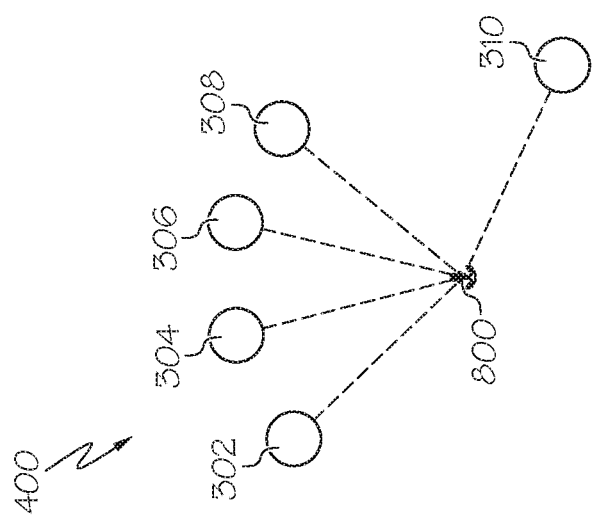
FIG. 8A depicts another cross sectional view of a virtual hand and an anchor point, according to one more embodiments shown and described herein.

FIG. 8B illustrates an example insphere 802 having an insphere radius 804 for the virtual hand 400. As the fingers of the virtual hand 400 become flatter, the insphere radius decreases, as shown in FIG. 8C. When the virtual hand is completely flat, the insphere collapses to a point. Using an insphere rather than a centroid to parent to an object may more accurately model the holding of an object.

In addition to causing objects to be held or released in the virtual world, the virtual object interaction scripts may also cause the haptic glove 106 to create a haptic response when the virtual hand 400 interacts with an object in the virtual world. This may increase the immersive experience of the player wearing the haptic glove 106.

Referring back to FIG. 2, when the object parameter reception module 274 receives parameters associated with an object that collides with the virtual hand 400, these parameters may include certain haptic parameters that may be set by game developers. In one example, haptic parameters of an object may indicate one or more haptic responses that should occur when the virtual hand 400 touches the object. For example, a haptic parameter of an object may indicate that the haptic glove 106 should vibrate, change temperature, and/or apply pressure or force feedback when the virtual hand touches the object.

The haptic data output module 282 may then output a signal to cause the haptic glove 106 to create the haptic response specified by the haptic parameters of the object received by the object parameter reception module 274. The haptic response to be created by the haptic glove 106 may be based in part on the collider data received by the collider data reception module. For example, depending on which fingers or portion of the virtual hand 400 are contacting the object in the virtual world, the signal output by the haptic data output module 282 may cause a haptic response to be produced at the corresponding fingers or portion of the haptic glove 106. In some examples, the haptic data output module 282 may transmit a signal to the haptic engine 260, which may then transmit a signal to the haptic glove 106 to cause the appropriate haptic response to be produced. In other examples, the haptic data output module 282 may transmit a signal directly to the haptic glove 106 to cause the appropriate haptic response to be produced.

In some examples, the object parameter reception module 274 may receive haptic parameters associated with the type of the object rather than specific haptic responses. These haptic parameters may represent a feel of the object to be replicated by the haptic glove 106. For example, the haptic parameters may indicate how hard or soft the object is, how hot or cold the object is, the texture of the object, and the like. The haptic data output module 282 may then output this data to the haptic engine 260, which may transmit a signal to the haptic glove 106 to cause the haptic glove 106 to create an appropriate haptic response based on the haptic parameters of the object. More specifically, the haptic engine 260 may interface with a driver of the haptic glove 106 to cause the haptic glove 106 to produce the appropriate haptic response.

In some examples, the haptic data output module 282 may also output collider data received by the collider data reception module 272 such that the haptic engine 260 causes specific fingers or portions of the haptic glove 106 to produce a haptic response based on which colliders on the virtual hand 400 are contacting the object. In this manner, a game developer may set haptic parameters of objects in the virtual world that the game developer desires to create a haptic response when they are interacted with by the virtual hand 400 of a virtual character. This may involve the game developer selecting desired properties of the objects (e.g., hardness, texture, temperature, and the like). The virtual object interaction scripts 270 and the haptic engine 260 may then handle the haptics for the haptic glove 106 without any additional coding required by the game developer. As such, game developers may easily integrate haptics into their game or virtual world without the need to learn details regarding the haptic driver of the haptic glove 106.

Figure 9:
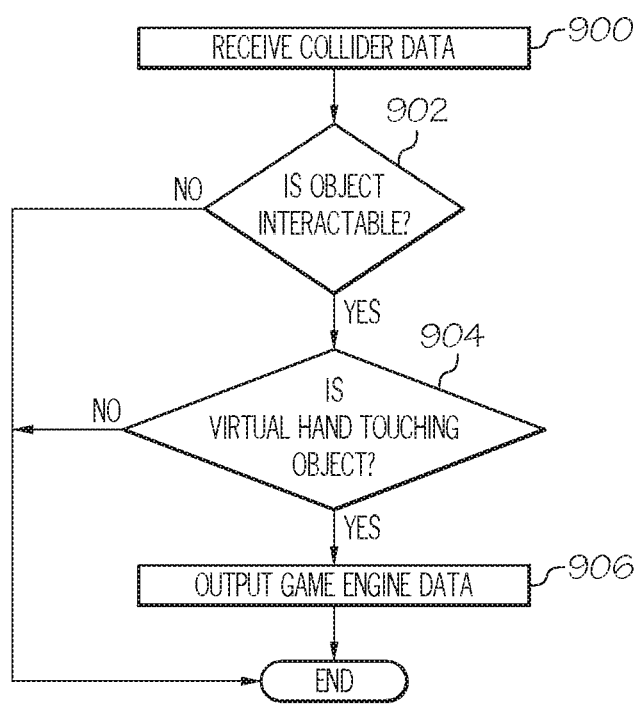
FIG. 9 depicts an example method of operating a gaming system, according to one or more embodiments shown and described herein.

FIG. 9 depicts a flowchart of an example method of operating the virtual object interaction scripts 270, according to one or more embodiments shown and described herein. At step 900, the collider data reception module 272 receives first data from the game engine 250. The first data is associated with a virtual interaction between the virtual hand 400 and a virtual object in a virtual world. The first data may comprise data associated with one or more colliders associated with the virtual hand 400. The object parameter reception module 274 may also receive parameters associated with the virtual object and the first data may include the parameters received.

At step 902, the interactable determination module 276 determines whether the virtual object is interactable based on the first data. The interactable determination module 276 may make this determination based on a parameter value of the virtual object received by the object parameter reception module 274. If the interactable determination module 276 determines that the virtual object is not interactable (no at step 902), then the method of FIG. 9 ends. If the interactable determination module 276 determines that the virtual object is interactable (yes at step 902), then control passes to step 904.

At step 904, the grasp determination module 278 determines whether the virtual hand 400 is touching the virtual object in the virtual world based on the first data. The grasp determination module 278 may also determine whether the virtual hand 400 should hold the virtual object based on the first data. The grasp determination module 278 may also determine whether to initiate a grab of the virtual object with the virtual hand 400 based on the first data. If the grasp determination module 278 determines that the virtual hand 400 is not touching the virtual object (no at step 904), then the method of FIG. 9 ends. If the grasp determination module 278 determines that the virtual hand 400 is touching the virtual object (yes at step 904), then control passes to step 906.

At step 906, the grasp data output module 280 outputs second data describing a relationship between the virtual hand 400 and the virtual object to the game engine 250 based on the first data. The second data may indicate whether the virtual hand 400 should hold the virtual object. The second data may cause the game engine 250 to change a relationship between the virtual hand 400 and the virtual object.

When the grasp determination module 278 determines that the virtual hand 400 should initiate a grab of the virtual object, the second data output by the grasp data output module 280 may cause the game engine 250 to establish a hierarchical relationship between the virtual hand 400 and the virtual object. In some examples, the grasp determination module 278 may determine whether to release a virtual object being held by the virtual hand 400 based on the first data. When the grasp determination module 278 determines to release the virtual object, the second data output by the grasp data output module 280 may cause the game engine 250 to remove a hierarchical relationship between the virtual hand 400 and the virtual object.

Figure 10:
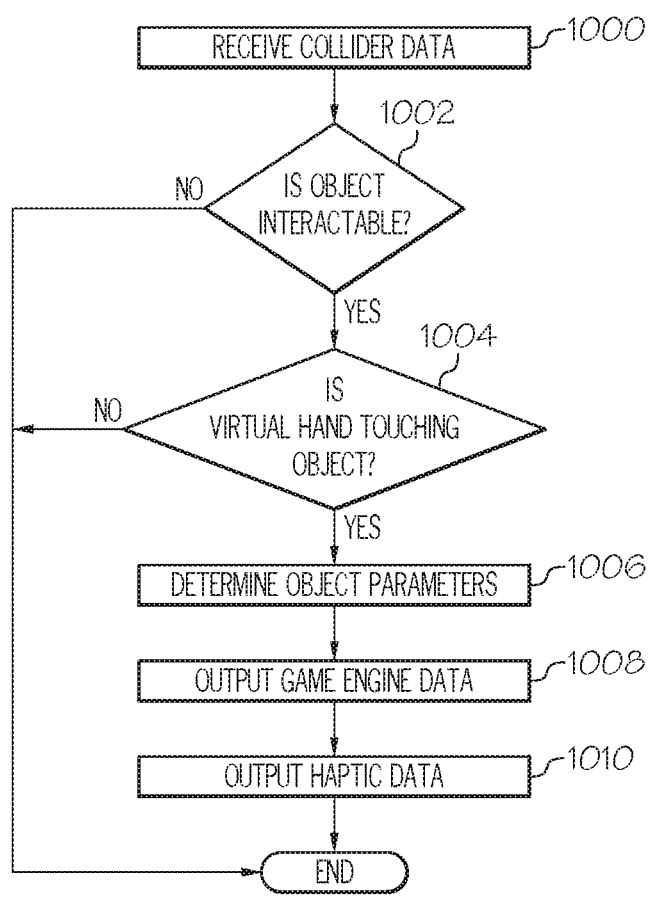
FIG. 10 depicts another example method of operating a gaming system, according to one or more embodiments shown and described herein.

FIG. 10 depicts a flowchart of another example method of operating the virtual object interaction scripts 270, according to one or more embodiments shown and described herein. At step 1000, the collider data reception module 272 receives collider data associated with a virtual object from the game engine 250. The object parameter reception module 274 may also receive parameter data associated with the object from the game engine 250. The parameter data may include haptic parameters.

At step 1002, the interactable determination module 276 determines whether the virtual object is interactable. The interactable determination module 276 may make this determination based on parameters received by the object parameter reception module 274. If the interactable determination module 276 determines that the virtual object is not interactable (no at step 1002), then the method of FIG. 10 ends. If the interactable determination module 276 determines that the virtual object is interactable (yes at step 1002), then control passes to step 1004.

At step 1004, the grasp determination module 278 determines whether the virtual hand 400 is touching the virtual object in the virtual world based on the collider data received by the collider data reception module 272. If the grasp determination module 278 determines that the virtual hand 400 is not touching the virtual object (no at step 1004), then the method of FIG. 10 ends. If the grasp determination module 278 determines that the virtual hand 400 is touching the virtual object (yes at step 1004), then control passes to step 1006.

At step 1006, the haptic data output module 282 determines one or more parameters associated with the virtual object based on the data received by the object parameter reception module 274. The parameters may include haptic parameters, which may include properties of the object (e.g., its hardness, texture, temperature, and the like). Alternatively, the haptic parameters may include haptic responses to be produced by the haptic glove 106 when the virtual hand 400 interacts with the object.

At step 1008, the grasp data output module 280 outputs data to the game engine describing a relationship between the virtual hand 400 and the virtual object based on the determination made by the grasp determination module 278. The data output by the grasp data output module 280 may cause the game engine 250 to change a hierarchical relationship between the virtual hand and the virtual object such that the virtual hand 400 picks up, releases, or otherwise affects the virtual object.

At step 1010, the haptic data output module 282 outputs data to the haptic engine 260 comprising a haptic response based on the data received by the collider data reception module 272 and the object parameter reception module 274. The data output by the haptic data output module 282 may cause the haptic glove 106 to create a haptic response. The particular haptic response created may be based on the haptic parameters received by the object parameter reception module 274.

It should be understood that embodiments described herein are directed to virtual object interaction scripts for interacting with a game engine and a wearable or non-wearable haptic device. A virtual world and a virtual character may be created using the game engine. One or more aspects of the virtual character may be controllable by a player to explore the virtual world. A wearable haptic glove or another wearable on non-wearable device may be worn or used by the player to control a virtual hand or other aspects of the virtual character. The virtual hand or other aspects of the virtual character may interact with virtual objects in the virtual world.

Virtual object interaction scripts may be used to manage interactions between the virtual hand or other aspects of the virtual character and the virtual objects in the virtual world. The virtual object interaction scripts may also be used to control haptic responses of the wearable haptic glove when the virtual hand or other aspects of the virtual character interact with the virtual objects in the virtual world. Colliders may be placed at various locations on the virtual hand. When the virtual hand interacts with a virtual object in the virtual world, the game engine may send collider data to the virtual interaction scripts based on the interactions that occur in the virtual world. Parameters may also be associated with objects in the virtual world, including haptic parameters.

When the virtual interaction scripts receive collider data associated with an interaction between the virtual hand and a virtual object in the virtual world, the virtual interaction scripts may determine whether the virtual hand should pick up, release, or otherwise interact with the virtual object based on the received collider data and parameters. The virtual interaction scripts may then transmit a signal to the game engine to cause the virtual hand to interact with the virtual object accordingly.

The virtual interaction scripts may also transmit a signal to a haptic engine to cause a haptic response to be produced in the haptic glove based on the received collider data and parameters. The haptic engine may then transmit a signal to the haptic glove to cause the appropriate haptic response to be produced.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   receiving first data from a game engine, the first data associated with a virtual interaction between a virtual hand and a virtual object in a virtual world;
   determining if the virtual object is interactable based on the first data;
   determining if the virtual hand is touching the virtual object in the virtual world based on the first data; and
   when it is determined that the virtual object is interactable and the virtual hand is touching the virtual object, outputting second data describing a relationship between the virtual hand and the virtual object based on the first data, thereby causing the virtual hand to perform an action with respect to the virtual object in the virtual world.

2. The method of claim 1, wherein the second data causes the game engine to change the relationship between the virtual hand and the virtual object.

3. The method of claim 1, wherein the first data comprises data associated with one or more colliders associated with the virtual hand.

4. The method of claim 1, further comprising:
   determining whether the virtual hand should hold the virtual object based on e first data; and
   outputting the second data to indicate whether the virtual hand should hold the virtual object.

5. The method of claim 1, further comprising:
   determining whether to initiate a grab of the virtual object with the virtual hand based on the first data; and
   when it is determined to initiate a grab of the virtual object with the virtual hand, the second data causes the game engine to establish a hierarchical relationship between the virtual hand and the virtual object.

6. The method of claim 5, wherein:
   the virtual hand comprises at least one collider on each finger of the virtual hand and at least one collider on a thumb of the virtual hand; and
   it is determined to initiate a grab of the virtual object with the virtual hand when at least one collider on a finger of the virtual hand is touching the virtual object and at least one collider on the thumb of the virtual hand is touching the virtual object.

7. The method of claim 1, wherein:
   the virtual hand comprises at least one collider on each finger of the virtual hand and at least one collider on a palm of the virtual hand; and
   it is determined to initiate a grab of the virtual object with the virtual hand when at least one collider on a finger of the virtual hand is touching the virtual object and at least one collider on the palm of the virtual hand is touching the virtual object.

8. The method of claim 1, further comprising:
   determining whether to release a virtual object being held by the virtual hand based on the first data; and
   when it is determined to release the virtual object, the second data causes the game engine to remove a hierarchical relationship between the virtual hand and the virtual object.

9. The method of claim 8, wherein:
   the virtual hand comprises at least one collider on each finger of the virtual hand;
   a grab of the virtual object was initiated when at least one collider on at least one finger of the virtual hand made contact with the virtual object; and
   it is determined to release the virtual object when a ratio between a first distance between the at least one finger and a center of mass of the virtual object at a first time when the grab was initiated and a second distance between the at least one finger and the center of mass of the virtual object at a second time after the first time is greater than a predetermined threshold.

10. The method of claim 1, wherein the virtual hand comprises:
    a collider positioned at the fingertip of each finger and thumb of the virtual hand;
    a collider positioned at the knuckle at the midpoint of each finger and thumb of the virtual hand;
    a collider positioned at the knuckle at the base of each finger and thumb of the virtual hand;
    a collider positioned at the base of a palm of the virtual hand;
    a collider on each finger and thumb of the virtual hand positioned between the collider at the fingertip and the collider at the knuckle at the midpoint of the finger or thumb;
    a collider on each finger and thumb of the virtual hand positioned between the collider at the knuckle at the midpoint of the finger and the collider positioned at the knuckle at the base of the finger;
    a collider comprising a first convex mesh bounding the colliders at the knuckles at the base of each finger and the collider at the base of the palm; and
    a collider comprising a second convex mesh bounding the collider at the knuckle at the base of the thumb, the collider at the knuckle at the base of the finger closest to the thumb, and the collider at the base of the palm.

11. The method of claim 1, further comprising:
    when it is determined that the virtual object is interactable and the virtual hand is touching the virtual object, outputting third data comprising a haptic response based on the first data.

12. The method of claim 11, wherein the third data causes a haptic device to create the haptic response.

13. The method of claim 11, further comprising:
    when it is determined that the virtual object is interactable and the virtual hand is touching the virtual object, determining one or more parameters associated with the virtual object; and
    outputting the third data comprising the haptic response based at least in part on the one or more parameters.

14. The method of claim 13, wherein at least one parameter associated with the virtual object comprises a texture of the virtual object.

15. The method of claim 13, wherein at least one parameter associated with the virtual object comprises a temperature of the virtual object.

16. An apparatus comprising:
    one or more processors;
    one or more memory modules; and
    machine readable instructions stored in the one or more memory modules that, when executed by the one or more processors, cause the apparatus to:
    receive first data from a game engine, the first data associated with a virtual interaction between a virtual hand and a virtual object in a virtual world;
    determine if the virtual object is interactable based on the first data;
    determine if the virtual hand is touching the virtual object in the virtual world based on the first data; and
    when it is determined that the virtual object is interactable and the virtual hand is touching the virtual object, output second data describing a relationship between the virtual hand and the virtual object based on the first data, thereby causing the virtual hand to perform an action with respect to the virtual object in the virtual world.

17. The apparatus of claim 16, wherein the machine readable instructions, when executed by the one or more processors, cause the apparatus to output third data comprising a haptic response based on the first data.

18. A system comprising:
a haptic device;
a game engine;
an interaction script;
a haptic engine;
one or more processors;
one or more memory modules; and
machine readable instructions stored in the one or more memory modules that, when executed by the one or more processors, cause the interaction script to:
receive first data from the game engine, the first data associated with a virtual interaction between a virtual hand and a virtual object in a virtual world;
determine if the virtual object is interactable based on the first data;
determine if the virtual hand is touching the virtual object in the virtual world based on the first data; and
when it is determined that the virtual object is interactable and the virtual hand is touching the virtual object, output second data describing a relationship between the virtual hand and the virtual object based on the first data, thereby causing the virtual hand to perform an action with respect to the virtual object in the virtual world.

19. The system of claim 18, wherein the machine readable instructions, when executed by the one or more processors, cause the interaction script to:
determine whether the virtual hand should hold the virtual object based on the first data; and
output the second data to indicate whether the virtual object should hold the virtual object.

20. The system of claim 19, wherein the machine readable instructions, when executed by the one or more processors, cause the interaction script to output third data to the haptic; engine to cause the haptic device to perform a haptic response.

* * * * *